R. ROUGÉ
OPTICAL APPARATUS FOR BALLISTIC INVESTIGATION AND MEASURMENT.
APPLICATION FILED JUNE 23, 1920.
1,432,360.
Patented Oct. 17, 1922.
3 SHEETS—SHEET 1.
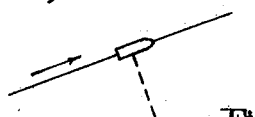
Fig. 1.
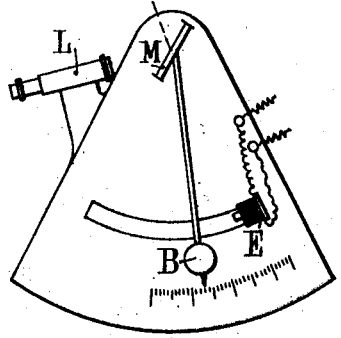
Fig. 2.
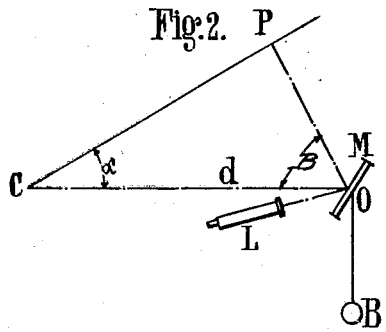
Fig. 3.
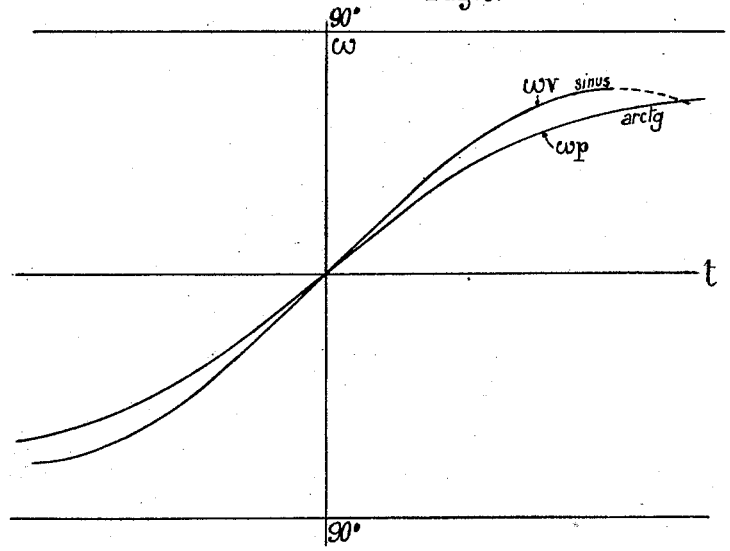
Fig. 4.
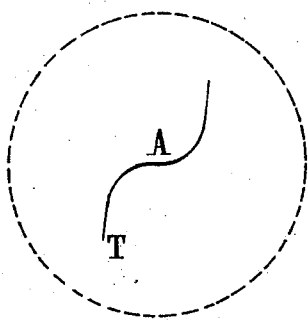
Fig. 5.
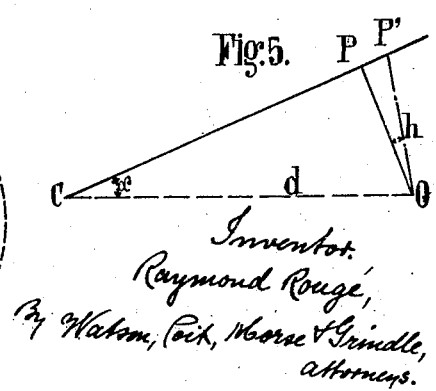
Inventor:
Raymond Rougé,
By Watson, Coit, Morse & Grindle,
Attorneys.

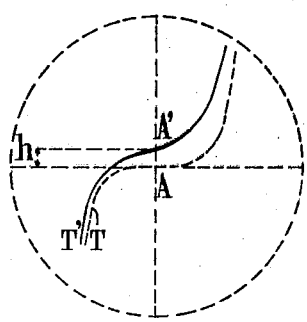
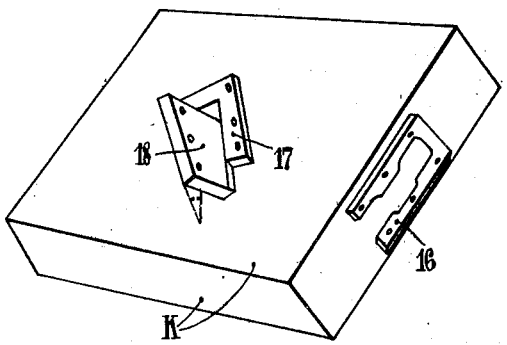
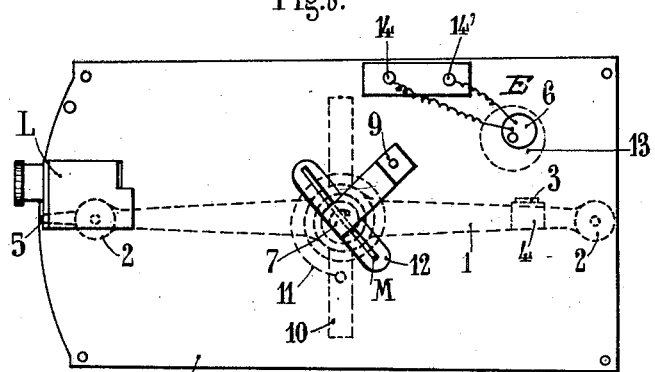
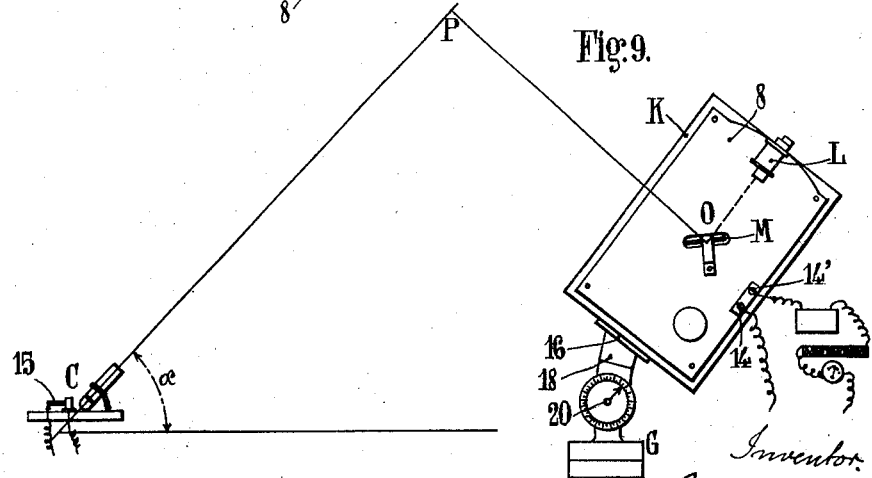

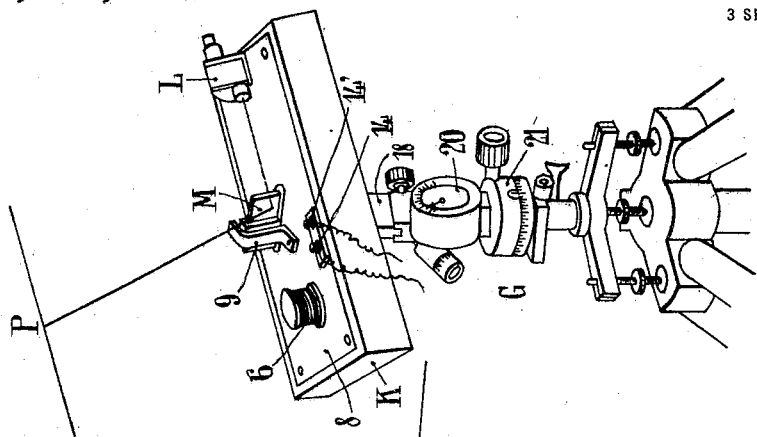
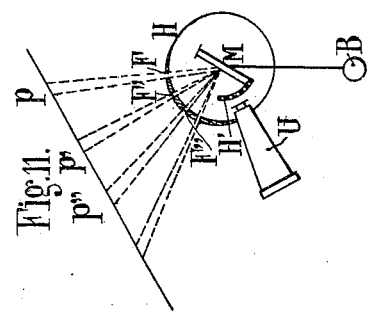

Patented Oct. 17, 1922.

1,432,360

UNITED STATES PATENT OFFICE.

RAYMOND ROUGÉ, OF PARIS, FRANCE.

OPTICAL APPARATUS FOR BALLISTIC INVESTIGATION AND MEASUREMENT.

Application filed June 23, 1920. Serial No. 391,127.

*To all whom it may concern:*

Be it known that I, RAYMOND ROUGÉ, residing 123 Rue de la Pompe, at Paris, Department of the Seine, France, have invented certain new and useful Optical Apparatus for Ballistic Investigation and Measurement (for which I have filed an application in France June 15, 1918), of which the following is a specification.

Observations of projectiles upon their trajectory are usually rendered impossible by reason of their high velocity. However, in case the angular speed of the ray passing from the observer to the projectile should diminish to a sufficient extent, the projectile can then be observed. This condition prevails for instance when the observer is stationed behind the cannon in the plane of fire.

This invention relates to an apparatus, whereby the observer is enabled to diminish and even to annul the angular speed of the line of sight during a sufficient length of time to allow of making useful observations, and particularly as concerns measurements of velocity of projectiles.

The invention consists essentially in a method of compensating the angular speed of motion of the projectile with reference to the observer, by means of the angular displacement of an oscillating mirror in which the projectile is sighted by the observer.

In the accompanying drawings one embodiment of the invention is illustrated.

Figure 1 shows a side elevation of the observation instrument with a reflector mounted on a pendulum;

Figure 2 is a diagrammatic view of the instrument in relation to a gun;

Figure 3 shows two curves, the one indicating the angular displacement of the projectile with reference to the observer, and the other the angular displacement of the sighting line;

Figure 4 shows another curve representing the path of the image of the projectile as observed along the horizontal wire of the telescope;

Figure 5 is a diagram indicating the manner of correcting the difference between assumed and actual velocity of the projectile;

Figure 6 is a view similar to Figure 4 showing the curves corresponding to Figure 5;

Figures 7 to 10 show the preferred form of construction of the instrument and

Figure 7 is a perspective view of the base of the instrument in the form of a box or housing for the different parts;

Figure 8 is a front view of the plate forming the box cover;

Figure 9 is a diagrammatic view of the instrument arranged for curved trajectory;

Figure 10 is a perspective view of the instrument set up on a tripod and arranged for flat trajectory; and Figure 11 is a view similar to Figure 1 showing a modification, where a camera replaces the telescope.

The apparatus comprises (Figs. 1 and 2) a pendulum B adapted to swing in the plane of observation. The electro-magnet E affords means for maintaining the pendulum out of its position of equilibrium and for releasing the same at the moment of firing, by the use of a suitable circuit breaking device such as muzzle wire, contact frame, cannon base contact, acoustic circuit breaker, or the like. Upon the oscillation shaft and in solid connection with the pendulum, is mounted a plane mirror M. A telescope L is provided for sighting the image of the projectile reflected in the said mirror.

It will be understood that these different variable factors can be regulated in such manner that the image sighted in the mirror shall be caused to pass at any given moment at the same point and at the same speed as the projectile upon its trajectory, whereby the velocity of the projectile will be compensated for the observer and he will therefore be able to view this latter in the mirror. To simplify the explanation, it will be supposed that the plane of observation coincides with the plane of firing, the apparatus being placed under the trajectory at the level of the muzzle of the cannon C (Fig. 2). It is also supposed that the pendulum is released exactly at the moment when the projectile leaves the cannon (initial point) and that the pendulum swings exactly according to the sinusoidal law, this being the case for a pendulum equilibrated by spiral spring.

The apparatus is adjusted as follows:

*a. Direction of sighting.*—The sighting ray OP which is reflected in the telescope when the pendulum is in its position of equilibrium, should pass through the point P of the trajectory lying nearest to the point O (Fig. 2). This adjustment can be made by varying the distance $d$, or more simply by changing the position of the mirror upon the shaft of the pendulum according to the firing angle α of the cannon; it would be a more simple matter to adopt a firing angle which is always the same and to construct the apparatus for use at this angle, as is the case in the embodiment of the invention to be further described (Fig. 7 et seq.)

*b. Adjustment of coincidence.*—The duration θ of the half-oscillation of the pendulum should be equal to the time required for the projectile to pass from the initial point to the point P. If $d$ is the distance from the base of the apparatus to the cannon muzzle, the following equation should be obtained:

$$\theta = \frac{d \cos \alpha}{V}$$

With α as a constant, the adjustment can be made by a proper selection of $d$ or by varying the duration of the pendulum swing.

*c. Adjustment for compensation.*—The two preceding adjustments provide for the condition in which the sighting line that is, the reflection of ray L O shall intersect the projectile at the point P, but in order that the image of the projectile shall be perceived, the angular speed of the projectile at the point P with reference to the observer $\left(\omega_p = \frac{V}{OP}\right)$ should be equal at this moment to the angular speed $\omega_v$ of the ray reflected in the swinging mirror. This condition is obtained by adjusting the electro magnet E the position of which determines the amplitude of the pendulum. If A is the amplitude of oscillation of the pendulum, or half the amplitude of the reflected ray, it will follow that:

$$A = \frac{2}{\pi} \cotan \alpha = 36° \ 30' \cotan \alpha$$

The initial distance or half amplitude of the pendulum should therefore be:

$$E_o = 18° \ 15' \cotan \alpha$$

and it will be observed that this initial distance depends exclusively upon the firing angle α. In order to facilitate the visibility of the projectile, it is advisable to make use of amplitudes of oscillation somewhat below the theoretical value in the case of firing angles below 42° and somewhat above the theoretical value for firing angles near or above 42°.

To sum up, the angular displacement of the projectile with reference to the observer will follow the law (Fig. 2):

$$\beta = \sin^{-1} \frac{Vt \sin \alpha}{(V^2 t^2 + d^2 - 2Vtd \cos \alpha)^{1/2}}$$

where β equals the angle β in Fig. 2, V equals the initial velocity of the projectile (assumed constant), $t$ equals time elapsed since discharge, $d$ equals the distance $d$ in Fig. 2, while the angular displacement of the sighting line will follow a sinusoidal law having the form:

$$\omega_v = K \cdot \sin \frac{1}{k} t.$$

Fig. 3 gives a diagrammatic illustration of these two curves of variation β and $\omega_v$.

Supposing the adjustment to have been perfectly carried out, i. e. giving a perfect coincidence and compensation for the projectile and the sighting line at the point P, the observation of the displacement of the image of the projectile in the field of the telescope will thus be reduced to the observation of the difference between the two curves of Fig. 3. If the adjustment is perfect as supposed, it is evident that the vertical motion of the image of the projectile in the telescope field will be arrested at the crossing point of the axes in Figure 3 that is at the crossing point of the wires of the telescope reticule. For instance, for a firing angle of about 45°, the path of the image in the telescope field will follow a curve of the kind indicated at T (Fig. 4), the vertical motion of the discharge being arrested upon the horizontal wire of the telescope.

The device thus affords a means whereby the initial velocity of the projectile can be measured by taking a simple reading. After adjusting the apparatus according to the approximate value of the calculated initial velocity, it will then be possible to proceed with experimental measurements. If the actual velocity of the projectile is for instance higher than the calculated value, the compensation will not be effected at the point P but at a point P' (Fig. 5) farther removed than P, and the stopping point will no longer occur at A on the curve T upon the telescope wire as in Figure 4, but will be observed above the latter at A' on the curve T', as seen in Figure 6.

If the apparent height $h$ of the projectile is measured in thousandths by means of a micrometer disposed upon the telescope, $h$ will represent the value of the angle $POP' = 1000 \frac{PP'}{OP}$ (Fig. 5). If V is the calculated theoretical velocity (or imaginary velocity of the projectile which passes through P at the same time as the sighting line for the position of equilibrium of the mirror) and if V' is the actual velocity of the fired projectile, then (Fig. 5)

$$\frac{V'}{V} = \frac{P'C}{PC} = \frac{d \cos \alpha + hd \sin \alpha}{d \cos \alpha} = 1 + h \tan \alpha$$

It will thus be observed that by means of a simple reading it becomes an easy matter to obtain the actual velocity V' of a projectile, either with reference to a previously calculated velocity V, or to the actual velocity V of other projectiles as already obtained from previous firing tests, and for which the apparatus has been adjusted in order that their image (for the average of the rounds) shall be formed upon the horizontal wire of the telescope.

Fig. 7 and following indicate the preferred form of construction of the apparatus according to this invention, making use of a pendulum with spiral spring, which has the advantage of affording measurements not only for curved but also for flat trajectories. In this construction, the apparatus is designed to operate for firing angles of approximately 45° this angle being the one which affords the easiest observation of the projectile.

The entire device is disposed within a box K which can be mounted upon a goniometer tripod. Fig. 7 is a perspective view of this box as seen from above and on one side, showing the slides which serve to mount the box upon the tripod. Fig. 8 is a front view of the plate which forms the box cover, allowing the mirror to pass through to the outside and carrying the telescope upon the outer face, while the pendulum is disposed upon the inner face. Fig. 9 is a diagrammatic view showing the arrangement of the apparatus for curved trajectories. Fig. 10 is a diagrammatic view in perspective showing the arrangement adopted for flat trajectories.

The pendulum (Fig. 8) is constituted by a rod 1 carrying at its ends the additional masses 2 and having disposed thereon the armature 3 of the electro-magnet imbedded in an insulating piece 4, and on the other hand the pointer 5 projecting outside the box whereby the pendulum can be set in position by bringing the armature 3 in contact with the electro-magnet E. The pendulum is mounted upon a shaft 7. The mirror M, constituted by a glass having parallel faces and beveled edges, is secured by its beveled edge in a dovetailed groove in the shaft 7. The whole is mounted upon the base plate 8 by means of a partial bridge piece 9 on the upper side and a complete bridge piece 10 on the under side. The spiral spring 11 is secured at one end to the bridge piece 10 and at the other end to the rod 1 or to the shaft thereof 7.

When the parts have been mounted in place, the mirror M will swing on the upper side of the base plate, while the pendulum swings underneath in the box. The pointer 1 is in the position of equilibrium when it lies parallel with the longer side of the plate 8, and the plane of the mirror M now makes an angle of 45° with the direction of the pointer. An oblique opening 12 is provided in order to give passage to the mirror, and in this manner the apparatus can be dismounted without requiring the dismounting of the elements of the pendulum.

The telescope is disposed above the base plate in order to be able to effect the sighting in the mirror in a direction parallel with the major axis of the apparatus, and the base line of the telescope in now parallel to the plane of the instrument base.

The electro-magnet E comprises a wire coil 6 having a core extending through a large circular opening and projecting downwardly; the coil is secured to the base plate by means of an eccentric piece 13, and by rotating this latter the core can be moved in such manner as to separate it from or bring it in proximity to the axis of the apparatus, whereby the initial position of the pendulum can be regulated. Since the core of the coil 6 and the armature 3 are of cylindrical form and cross each other at right angles, the conditions of contact will be the same in all positions. The ends of the winding come out under the base plate and are connected to insulated terminals 14 and 14' disposed upon the top, the latter being connected to the device 15 controlled by the discharge of the projectile, such as muzzle wire, acoustic vibrator or the like.

The box K is provided with two slides 17 and 16 of dovetailed form (Fig. 7) adapted to fit upon an intermediate member 18 which is properly gauged in order to secure it upon the usual goniometer tripods (Figs. 9 and 10). The slide 16 for curved trajectory is mounted upon the side of the box and situated parallel with the end of the base plate, while the second slide 17 for flat trajectory is disposed upon the bottom of the box and situated at 45° from the axis and perpendicular to the plane of equilibrium of the mirror.

Since the apparatus is constructed in the present manner in order to provide for an observation angle of 45°, the firing angle $\alpha$ should in general be equal to 45°. However a slight difference from this value can be allowed without any great inconvenience.

The firing operations can be followed from the same observation point, even though the angle and direction of the firing should vary in a slight degree, provided the plane of observation can be displaced, i. e. the plane generated by the reflected sighting line, in order to follow the trajectory. Since the initial point is practically stationary, it will suffice, in order to maintain the trajectory in the plane of observation, to cause this latter to rotate upon the instrument base. To obtain the observation angle of 45° in a precise manner, all that is required is to bring the sighting line of equilibrium upon the initial point, and by means of the goniometer mounting, to cause it to describe an angle of 45° or 800 thousandths. This displacement should be effected in the plane of observation, and the plane of the apparatus must therefore be perpendicular to the measuring mechanism employed for making this measurement.

If the apparatus is mounted upon the slide 16 for curved trajectory (Fig. 9), the plane of oscillation of the sighting line (or plane of observation) is perpendicular to the axis of rotation 20 of the goniometer elevation mechanism G, and therefore upon actuating this latter mechanism, the plane of observation will remain invariable while the sighting line will move from the horizontal as far as 50°. The drift mechanism will allow of directing the plane of observation.

When the apparatus is mounted upon the slide 17 for flat trajectory (Fig. 10), the plane of observation is parallel with the axis 20 of the mechanism of elevation of the goniometer G, and the sighting line of equilibrium situated at an angle of 45° with this axis, will generate a cone when the mechanism is actuated; the plane of observation can therefore rotate to 50° from the horizontal. The drift mechanism 21 allows of directing the position axis in order that it shall pass through the muzzle of the cannon C. The combination of these two movements will therefore afford ample means for causing the plane of observation to pass through the trajectory.

The invention can also be employed for photography or motion picture work in connection with projectiles.

For photographic work, the telescope is replaced (Fig. 11) by a camera U, the mirror M and the lens being disposed within a circular box H having therein a plurality of openings F, F', F'' suitably situated for the purpose of sighting the elements $p$, $p'$, $p''$ of the trajectory of the proper length and disposed in series and parallel with the axis of the drum H. By reason of the movement of the mirror together with the pendulum B, the images of the several openings will sweep over parallel portions of the photographic plate and each of these portions or zones will show the stationary image of the projectile upon the element of the trajectory corresponding to the opening pertaining thereto.

Claims:—

1. In an apparatus for observing projectiles a swinging mirror for receiving an image of a projectile, means for releasing the mirror to swing simultaneously with the discharge of the projectile and means for timing the swing of the mirror to arrest the motion of the image thereon.

2. An apparatus for the investigation and measurement of the initial velocity of cannon projectiles, comprising a swinging mirror, an optical stationary system for receiving the image of the projectile as reflected by the mirror, and means whereby the swinging movement of the mirror is started simultaneously with the firing.

3. An apparatus for the investigation and measurement of the initial velocity of cannon projectiles, comprising a swinging mirror, an optical stationary system for receiving the image of the projectile as reflected by the mirror, means whereby the swinging movement of the mirror is started simultaneously with the firing, and means for varying the initial angular position of the swinging mirror.

4. An apparatus for the investigation and measurement for the initial velocity of cannon projectiles, comprising a swinging mirror, a stationary telescope for observing the image of the projectile reflected in the mirror, and means whereby the swinging movement of the mirror is started simultaneously with the departure of the shot.

5. An apparatus for the investigation and measurement of the initial velocity of cannon projectiles, comprising a pendulum having a mirror mounted thereon, an electromagnet for maintaining the pendulum at a distance from its point of equilibrium, means for breaking the circuit of the electromagnet and allowing the pendulum to commence its swing simultaneously with the departure of the shot, and a telescope for observing the image of the projectile reflected in the mirror.

6. An apparatus for the investigation and measurement of the initial velocity of cannon projectiles, comprising a spring actuated pendulum, a mirror disposed on the pendulum, a magnet armature disposed upon the said pendulum, an electro-magnet adapted to cooperate with the said armature to maintain the pendulum at a distance from its position of equilibrium, means for adjusting the position of the electro-magnet whereby the initial position of the pendulum can be varied, means for breaking the circuit of the electro-magnet and allowing the pendulum to swing simultaneously with the departure of the shot, and a telescope for observing the image of the projectile reflected in the mirror.

7. An apparatus for the investigation and measurement of the initial velocity of cannon projectiles, comprising a support, a spiral spring mounted pendulum swinging upon the said support, a mirror disposed upon the shaft of the said pendulum, a magnet armature disposed on the said pendulum, an electro-magnet mounted on the said support for maintaining the said armature and pendulum at a distance from the position of equilibrium, means for breaking the circuit of the electro-magnet and allowing the pendulum to commence its swing simultaneously with the departure of the shot, a telescope for observing the image of the projectile reflected in the mirror, and means on the support for attaching the assemblage to a conventional goniometer support.

8. An apparatus for observing of projectiles in motion, comprising a receptacle containing openings adapted to be directed towards corresponding elements of the trajectory of the projectile, a mirror contained in the said receptacle and mounted upon a swinging shaft, an optical instrument having its lens disposed within the said receptacle and directed towards the said mirror, and means whereby the said mirror is caused to swing simultaneously with the departure of the shot.

In testimony whereof, I have signed my name to this specification.

RAYMOND ROUGÉ.